United States Patent [19]
Paar et al.

[11] Patent Number: 4,789,696
[45] Date of Patent: Dec. 6, 1988

[54] CATALYZED CATIONIC PAINT BINDERS

[75] Inventors: Willibald Paar; Johann Gmoser, both of Graz, Austria

[73] Assignee: Vianova Kunstharz, A.G., Werndorf, Austria

[21] Appl. No.: 98,892

[22] Filed: Sep. 21, 1987

[30] Foreign Application Priority Data

Sep. 19, 1986 [AT] Austria .................................. 2511/86

[51] Int. Cl.$^4$ ............................ C09D 3/58; C09D 5/44; C08L 63/10
[52] U.S. Cl. ..................................... 523/414; 523/415; 523/416; 523/417; 524/595; 525/523; 525/530; 528/45; 528/92; 528/237; 528/368; 204/181.7
[58] Field of Search ................ 523/414, 416, 417, 415; 525/530, 523; 528/45, 111, 120, 92, 237, 368; 524/595; 204/181.7

[56] References Cited

U.S. PATENT DOCUMENTS

| 4,384,946 | 5/1983 | Patzschke et al. | 523/414 X |
|---|---|---|---|
| 4,423,167 | 12/1983 | Valko | 523/417 X |
| 4,423,168 | 12/1983 | Valko | 523/414 |
| 4,423,169 | 12/1983 | Valko | 523/414 |
| 4,440,612 | 4/1984 | Valko | 523/414 X |
| 4,484,994 | 11/1984 | Jacobs et al. | 523/414 X |
| 4,491,611 | 1/1985 | Barnhoorn et al. | 523/417 X |
| 4,543,376 | 9/1985 | Schupp et al. | 523/413 X |
| 4,595,717 | 6/1986 | Patzschke et al. | 523/414 |

Primary Examiner—Earl Nielsen
Attorney, Agent, or Firm—A. W. Breiner

[57] ABSTRACT

Cationic paint binders, particularly binders of the type used in cathodic electrodeposition coatings which crosslink through transesterification, transamidation, transurethanization, or through the reaction of chain end double bonds catalyzed with a condensation product of a dialkyltinoxide and a compound carrying at least one hydroxyl group are described. The hydroxyl compounds are the aliphatic alcohols, phenols, alkanolamines, or the reaction products of primary amines with monoepoxy compounds. The catalysts of the invention provide very good stability and good compatibility in aqueous cationic paint materials.

17 Claims, No Drawings

CATALYZED CATIONIC PAINT BINDERS

FIELD OF INVENTION AND BACKGROUND

The invention is concerned with a process for catalyzing cationic paint binders. More particularly, the invention relates to catalyzed paint binders of the type used in cathodic electrodeposition coatings.

Cathodically depositable electrodeposition paints essentially are crosslinked at elevated temperature through transesterification, transamidation, transurethanization, or through the reaction of chain end double bonds. It is known that crosslinking reactions of this type are catalyzed with metal compounds. In practically all cases, catalyzation for the curing of cathodically depositable paint films is necessary to achieve the performance required for commercial applications. The most important catalysts used in practice are compounds of tin(IV), used mainly as dibutyltinoxide $(C_4H_9)_2$ SnO or as dibutyltindilaurate $(C_4H_9)_2Sn(OCOC_{12}H_{25})_2$. All catalysts presently used for this purpose, however, lead to essential disadvantages in cathodically deposited electrodeposition paints.

Dibutyltinoxide is a solid substance which must be incorporated in finely distributed form in the paint and the material as a catalyst becomes effective only after dissolution. Thus, the use of this catalyst requires long periods of homogenization. When dibutyltindilaurate is employed in the paint, acid is set free through hydroylsis, which is particularly troublesome in the operation of electrodeposition installations. Furthermore, the known catalysts, in general, have poor compatibility with the resin binders of the paints. In many cases, storage stability falls off, particularly of diluted bath materials of the type which are used for replenishing electrodeposition baths.

SUMMARY OF INVENTION

It has now been found that the above-noted disadvantages can be avoided when the condensation products of dialkyltinoxide and hydroxyl compounds are used as the catalyst. The condensation products are easily prepared in a simple manner and can be formulated such that the products are compatible with the resins under all conditions, i.e., even when cold. The condensation products do not split off critical substances, such as an acid, and have sufficient metal content to be effective catalysts.

Thus, the invention is primarily concerned with catalyzed cationic paint binders crosslinkable through transesterification and/or transamidation and/or transurethanization and/or reaction of chain end double bonds wherein the catalyst is a condensation product of a dialkyltinoxide and a compound carrying at least one hydroxyl group. The invention is further concerned with the process of catalyzing cationic paint materials with condensation products of dialkyltinoxide and a compound carrying at least one hydroxyl group, particularly with electrodeposition materials (ED baths).

The catalysts used according to the present invention are compatible even when stored cold with various cationic materials including condensation resins, polymerization resins, and polyaddition resins. The organophilic molecule segments of the catalysts enable them to stay in the resin phase and thus also, through endosmosis, in the substantially dewatered film. On storage or in the electrodeposition bath, no detrimental hydrolytic splitting occurs. The split-off products which may occur on stoving are volatile and ecologically harmless.

GENERAL DESCRIPTION OF INVENTION AND PREFERRED EMBODIMENTS

The tin(IV) compounds used in preparing the condensation products are dialkyltinoxides, preferably the commercially available dibutyltinoxide. Suitable hydroxyl compounds for reaction with the dialkyltinoxides are aliphatic alcohols, preferably those carrying more than four C-atoms, or phenols. If the hydroxyl compounds used also carry amino groups, the products can be rendered water-soluble through protonation. In such case, they can be directly added to the diluted paint materials. Suitable hydroxyl and amino group containing compounds are the alkanolamines, or preferably reaction products of primary amines with monoepoxy compounds. Special advantages are obtained when the soluble reaction compounds of monoalkanolamines or alkylmono- or diamines and the commercially available glycidyl esters of fatty acids, particularly those of the so-called KOCH-acids, are used.

The reaction of the hydroxyl compound with the tin compound to form the condensation products is preferably carried out at from about 100° to 200° C. The reaction water which is formed is preferably removed through azeotropic distillation with an entraining agent.

The catalyst compounds used according to the invention can be added to the paint material at any phase of paint preparation. The addition is either made in concentrated form to the binder, or to an optionally employed pigment grinding resin or to the pigment paste. Protonation can be effected jointly with the binder if desired. Further, the compounds, if carrying protonable groups, can be added in the neutralized state and diluted with water, and/or with an auxiliary solvent to the diluted paint materials. On electrodeposition, in such case, the diluted aqueous solution can be added to the bath materials during operation.

Paint binders which can be catalyzed with the catalysts of the present invention are known in the art and preferably are the commercially available binders known for use in electrodeposition paints. These binders include binders crosslinkable through transesterification, or transamidation, or transurethanization, or reaction of chain end double bonds. These compositions and the chemistry of such binders are well known in the literature.

PRESENTLY PREFERRED EMBODIMENTS

The following examples illustrate the invention without limiting its scope. Parts and percentages are by weight unless otherwise stated.

Preparation Of Catalyst Compounds

The hydroxyl component and the tin compound to form the condensate are reacted at the temperature listed and in the weight ratios set forth in Table 1. The calculated quantity of reaction water is removed with an entraining agent such as toluol or xylol by azeotropic distillation. The entraining agent is vacuum-stripped. The catalyst component is optionally diluted with a suitable solvent, preferably methoxypropanol.

TABLE 1

| Catalyst | Dibutyl-tinoxide Parts | Hydroxyl-Component Parts | Reaction Temperature °C. | % Solids Content/% Sn in Solids |
|---|---|---|---|---|
| K 1 | 249 | 220 Nonylphenol | 120 | 100/26 |
| K 2 | 249 | 260 2-Ethylhexanol | 140 | 100/24 |
| K 3 | 249 | 311 Hydroxyamine I | 130 | 90/22 |
| K 4 | 498 | 616 Hydroxyamine II | 200 | 80/22 |

Hydroxyamine I: Reaction product of 1 mole monoethanolamine and 1 mole Cardura E 10 which is the monoglycidylester of a $C_9$-$C_{11}$ KOCH-acid; MW 311.

Hydroxyamine II: Reaction product of 1 mole 1,6-hexamethylene diamine and 2 moles Cardura E 10 which is the monoglycidylester of a $C_9$-$C_{11}$ KOCH-acid; MW 616.

Preparation Of Paint Binders

BM 1: In a suitable reaction vessel, 220 parts nonylphenol (1 mole) are heated to 75° C. together with 130 parts diethylaminopropylamine (1 mole) and 100 parts toluol. With slight cooling, 33 parts paraformaldehyde 91% (1 mole) are added. The temperature is slowly raised until a continuous distillation starts. After separation of 21 parts reaction water, the toluol is vacuum-stripped and the product is dissolved with 167 parts diethyleneglycoldimethylether.

The solution is blended at 30° to 40° C., while cooling, with 304 parts (1 mole) of a toluylene diisocyanate semiblocked with 2-ethylhexanol and held at the temperature of 40° C. for 90 minutes at which time the NCO-value is practically zero. Then, 475 parts of an epoxy resin based on Bisphenol A and epichlorohydrin (epoxy equivalent weight 475) are dissolved in 200 parts propyleneglycol monomethylether, and, after addition of 835 parts of the above intermediate, are reacted at 95 to 100° C. to an epoxy value of practically zero.

BM 2: 500 parts of an epoxy resin based on Bisphenol A and epichlorohydrin (epoxy equivalent weight about 500) are dissolved in 214 parts propyleneglycol monomethylether and reacted at 110° C. with 83 parts of a semiester of phthalic acid anhydride and 2 ethylhexanol, in the presence of 0.5 parts of triethylamine as catalyst, to an acid value of below 3 mg KOH/g. Then, 120 parts of an NH-functional oxazolidine of aminoethylethanolamine, 2-ethylhexylacrylate and formaldehyde, and 26 parts diethylaminopropylamine are added and the batch is reacted at 80° C. to an epoxy value of practically zero. The batch is diluted with 200 parts propyleneglycol monomethylether. 70 parts (resin solids) of this oxazolidine modified epoxy resin amine adduct are homogenized for 30 minutes at 50° C. with 30 parts based on resin solids of a crosslinking component obtained through reaction of 1 mole of a toluylene diisocyanate semi-blocked with 2-ethylhexanol and 0.33 moles triethanolamine. The reaction is carried out in a 70% solution of diethyleneglycol dimethylether, at 50 to 60° C. until all isocyanate groups have reacted.

BM 3: 75 parts of the adduct described under BM 2 are homogenized with 25 parts of a crosslinking component according to Component B 2 of U.S. Pat. No. 4,458,054 at 70° C. for one hour. This crosslinking component is a transesterification product of 396 parts dimethyl malonate and 134 parts trimethylolpropane. The reaction is carried out at 130° C. in the presence of 1.1 parts zinc octoate, until a hydroxyl value of below 20 mg KOH/g is attained.

BM 4: In a reaction vessel equipped with stirrer, thermometer and reflux condensor, 1000 parts of an epoxy resin based on Bisphenol A and epichlorohydrin (epoxy equivalent about 500) are dissolved in 492 parts ethylglycolacetate at 60 to 70° C. 0.2 parts hydroquinone and 144 parts acrylic acid are added and the temperature is raised to 100 to 110° C. At this temperature the reaction is carried to an acid value of below 5 mg KOH/g. Then the reaction product, at 60 to 70° C., is mixed with 652 parts of a monoisocyanate of 1 mole toluylene diisocyanate and 1 mole of diethylethanolamine (70% in methylisobutylketone) and reacted to an NCO-value of practically zero.

EXAMPLES 1-6

Clear varnishes are prepared according to Table 2.

TABLE 2

| Example | Binder 100 Parts Resin Solids | mMoles Formic Acid (per 100 Parts Resin Solids) | Catalyst Compound % Sn | | Solids Content Clear Varnish % |
|---|---|---|---|---|---|
| 1 | BM 1 | 50 | 0.7 | K 1 | 14 |
| 2 | BM 1 | 50 | 0.8 | K 2 | 15 |
| 3 | BM 2 | 40 | 1.0 | K 3 | 12 |
| 4 | BM 2 | 40 | 0.8 | K 4 | 12 |
| 5 | BM 3 | 40 | 0.5 | K 2 | 15 |
| 6 | BM 4 | 60 | 0.6 | K 1 | 14 |

The clear varnishes diluted with deionized water to a solids content as set forth in Table 2 are clear and stable to sedimentation.

COMPARISON EXAMPLE A

A clear varnish is prepared from binder BM 2 and the addition of 1.0 part (metal) dibutyltindilaurate and diluted with deionized water. The comparison pain is turbid and shows pronounced sedimentation after only three days.

Table 3 lists the properties of films electrodeposited from the clear varnishes of Examples 1-6 and Comparison Example A on degreased steel panels. The stability of the paints on stirring is also noted. The films were cured for twenty-five (25) minutes at the temperatures stated in Table 3. Methylethylketone stability (MEK-rubs) was tested after twenty-four (24) hours. Stirring stability is given in the number of weeks after which the film properties are considerably changed.

TABLE 3

| Example | Stoving Temperature °C. | MEK-Rubs | Stirring Stability Weeks | Film After Stirring Test |
|---|---|---|---|---|
| 1 | 160 | over 200 | over 8 | unchanged |
| 2 | 160 | over 200 | over 8 | unchanged |
| 3 | 180 | 180 | 8 | slightly uneven, clear |
| 4 | 180 | 200 | over 8 | unchanged |
| 5 | 160 | over 200 | 7 | unchanged |
| 6 | 170 | 180 | 5 | slightly uneven, clear |
| A | 180 | 180 | 1 | uneven, turbid |

As will be apparent to one skilled in the art, various modifications can be made within the scope of the aforesaid description. Such modifications being within the ability of one skilled in the art form a part of the present invention and are embraced by the appended claims.

It is claimed:

1. Process for catalyzing cationic paint binders crosslinkable through at least one of transesterification, transamidation, transurethanization, or reaction of chain end double bonds comprising adding to said binder, as a catalyst, a condensation product of a dialkyltinoxide and a compound carrying at least one hydroxyl group.

2. The process according to claim 1 wherein the hydroxyl compound is an aliphatic alcohol or a phenol.

3. The process according to claim 2 wherein the aliphatic alcohol has four or more carbon atoms.

4. The process according to claim 1 wherein the hydroxyl compound is an alkanolamine.

5. The process according to claim 1 wherein the hydroxyl compound is a soluble reaction product of a primary amine and a monoepoxy compound.

6. The process according to claim 5 wherein said primary amine is a monoalkanolamine.

7. The process according to claim 5 wherein said primary amine is alkylmonoamine.

8. The process according to claim 5 wherein said primary amine is alkylenediamine.

9. The process according to claim 1 wherein the condensation product contains basic groups and the condensate is added to the paint binder in protonated form.

10. Cationic paint binders crosslinkable through at least one of transesterification, transamidation, transurethanization, or reaction of chain end double bonds in combination with, as a catalyst, a condensation product of a dialkyltinoxide and a compound carrying at least one hydroxyl group.

11. The cationic paint binders according to claim 10 wherein the hydroxyl compound is an aliphatic alcohol or a phenol.

12. The cationic paint binders according to claim 11 wherein the aliphatic alcohol has four or more carbon atoms.

13. The cationic paint binders according to claim 10 wherein the hydroxyl compound is an alkanolamine.

14. The cationic paint binders according to claim 10 wherein the hydroxyl compound is a soluble reaction product of a primary amine and a monoepoxy compound.

15. The cationic paint binders according to claim 14 wherein said primary amine is a monoalkanolamine.

16. The cationic paint binders according to claim 14 wherein said primary amine is alkylmonoamine.

17. The cationic paint binders according to claim 14 wherein said primary amine is alkylenediamine.

* * * * *